Feb. 2, 1954     B. L. THOMPSON     2,668,063
VEHICLE TOW LINE
Filed Dec. 4, 1950
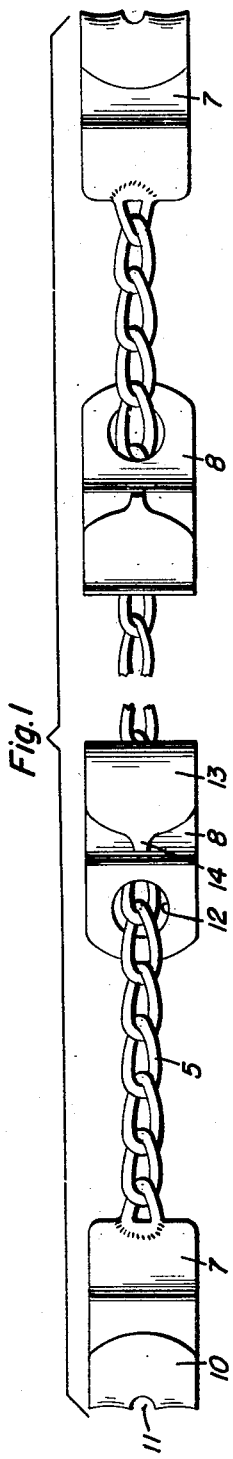
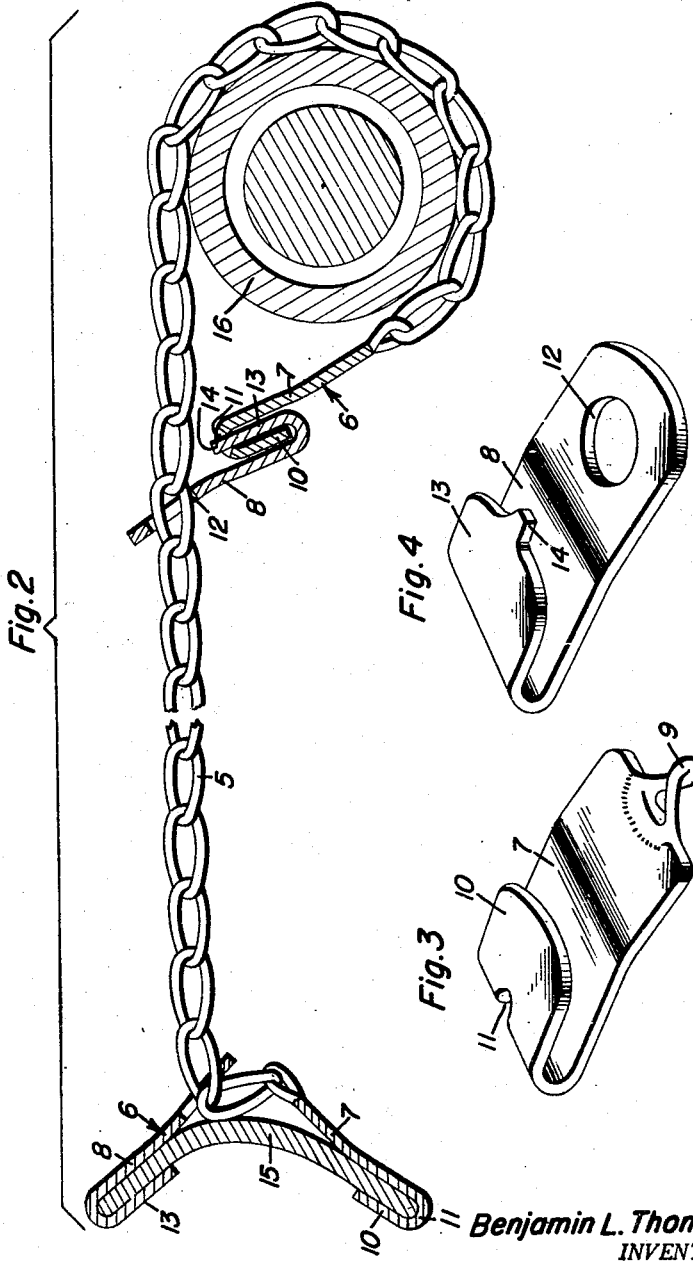
Benjamin L. Thompson
INVENTOR.

Patented Feb. 2, 1954

2,668,063

UNITED STATES PATENT OFFICE 2,668,063

VEHICLE TOW LINE

Benjamin L. Thompson, Springfield, Colo.

Application December 4, 1950, Serial No. 198,954

2 Claims. (Cl. 280—415)

1

The present invention relates to new and useful improvements in vehicle tow lines and more particularly to means for easily and quickly attaching the ends of a tow line to a bumper or other part of a vehicle.

An important object of the invention is to provide each end of a tow line with a pair of clamping hooks adapted for clamping engagement with the upper and lower edges of a vehicle bumper, or for gripping engagement with each other to hold the tow line wrapped about a vehicle rear axle or other parts of the vehicle.

Another object is to provide a device of this character of simple and practical construction, which is strong and durable, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts through, and in which:

Figure 1 is a side elevational view showing the tow line detached;

Figure 2 is a similar view showing the clamping hooks at one end of the tow line arranged for gripping a vehicle bumper and with the clamping hooks at the other end of the tow line arranged for fastening the same to the rear axle of another vehicle;

Figure 3 is a perspective view of one of the clamping hooks; and

Figure 4 is a similar view of a companion hook.

Referring now to the drawings in detail, wherein for the purpose of illustration I have disclosed a preferred embodiment of the invention, the numeral 5 designates a chain or other flexible member which may be used as a tow line and to each end of which fastening means 6 is attached. The fastening means at each end of the chain is of duplicate construction and accordingly, a detailed explanation of one will suffice for both.

The fastening means comprises a pair of clamping plates 7 and 8, the plate 7 having a twisted eye 9 at one end for permanently attaching one end of the tow line 5 thereto. The outer end of plate 7 is bent rearwardly to form a channel-shaped hook 10 and with an opening 11 formed at the base of the channel.

The other clamping plate 8 is provided with an opening 12 adjacent one end to freely receive the tow line and the other end of plate 8 is also bent inwardly to form a channel-shaped hook 13. A

2 tongue 14 is formed at the inner edge or bill portion of the hook.

In placing the invention in use, the fastening means 6 at one end of the tow line 5 may be attached to a vehicle bumper 15 by engaging the hook 10 of clamping plate 7 with the lower edge of the bumper and engaging the hook 13 of clamping plate 8 with the upper edge of the bumper, as shown at the left hand end of the tow line in Figure 2 of the drawings.

The fastening means 6 at the other end of the tow line may be attached to a rear axle 16 of another vehicle by wrapping the chain 5 around the axle and interlocking the hooks 10 and 13 of the clamping plates 7 and 8 with each other, as shown at the right hand end of the tow line in Figure 2. When fastening the tow line 2 and axle in this manner with the hooks 10 and 13 interlocked, the tongue 14 of hook 13 enters the opening 11 of hook 10 to prevent transverse sliding movement of the hooks relative to each other and thus avoid separation of the hooks.

It will thus be apparent that the fastening means 6 at one end of the tow line 5 may be attached to the front bumper of one vehicle and the fastening means 6 at the other end of the tow line fastened to the rear bumper of a towing vehicle.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

I claim:

1. A vehicle tow line comprising a flexible member, and fastening means at least at one end of the flexible member and including a pair of elongated plates, one of said plates having an opening adjacent one end adapted to slidably receive the flexible member and a channel-shaped hook at its other end, and a second elongated plate having an eye at one end to which one end of the flexible member is attached and also having a channel-shaped hook at its other end, said second-named plate being adapted for turning about its longitudinal axis on the flexible member to selectively position the hooks of the pair of plates either in intergripping engagement with each other to secure one end of the flexible member to an axle of a vehicle or to position said hooks in opposed gripping relation to each other for gripping the upper and lower edges of a vehicle bumper, said hooks having cooperating means retaining the same in position when in intergripping engagement.

2. In combination, a tow line and means for selectively fastening the tow line to an axle and a bumper, said means comprising a first elongated flat plate secured at one end to the end of said tow line, the other end of said plate being bent upon itself and constituting a first channel shaped hook, a second elongated flat plate, means slidably and rotatably mounting said second plate at one end thereof on said tow line, the other end of said second plate being bent upon itself and constituting a second channel shaped hook, the web of one of said channel shaped hooks having a central aperture therein, and a lug projecting from the edge of the rebent portion of the other of said hooks interengaged with said central aperture when the hooks intergrippingly engage one another for fastening a portion of the tow line in encircling engagement with an axle, said hooks being in opposed gripping relation to one another for fastening the tow line to a bumper.

BENJAMIN L. THOMPSON.

References Cited in the file of this patent

UNITED STATES PATENTS

| Number | Name | Date |
| --- | --- | --- |
| 62,489 | Hopkins | Feb. 26, 1867 |
| 596,908 | O'Neill | Jan. 4, 1898 |
| 753,989 | Morris | July 21, 1903 |
| 1,177,856 | Gaydeski | Apr. 4, 1916 |
| 1,249,959 | Hodges | Dec. 11, 1917 |
| 1,537,785 | Parker | May 12, 1925 |
| 2,346,099 | Wilson | Apr. 4, 1944 |
| 2,435,813 | Williams | Feb. 10, 1948 |
| 2,474,078 | Wilcox | June 21, 1949 |
| 2,494,526 | Tungett et al. | Jan. 10, 1950 |